United States Patent
Wachi

(10) Patent No.: US 8,613,510 B2
(45) Date of Patent: Dec. 24, 2013

(54) INK COMPOSITION FOR INK JET RECORDING AND INK JET RECORDING METHOD USING THE SAME

(75) Inventor: Naotaka Wachi, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 107 days.

(21) Appl. No.: 13/246,228

(22) Filed: Sep. 27, 2011

(65) Prior Publication Data

US 2012/0075381 A1 Mar. 29, 2012

(30) Foreign Application Priority Data

Sep. 28, 2010 (JP) ................................. 2010-217948

(51) Int. Cl.
*C09D 11/00* (2006.01)

(52) U.S. Cl.
USPC ........................................................ 347/100

(58) Field of Classification Search
USPC ........................................................ 347/100
See application file for complete search history.

(56) References Cited

U.S. PATENT DOCUMENTS

| 5,955,515 A | 9/1999 | Kimura et al. | |
| 2003/0164869 A1 * | 9/2003 | Yang et al. | 347/100 |
| 2004/0001926 A1 * | 1/2004 | Sharma et al. | 428/32.15 |

FOREIGN PATENT DOCUMENTS

| JP | 9-39381 A | 2/1997 |
| JP | 2003-285532 A | 10/2003 |

* cited by examiner

*Primary Examiner* — Laura Martin
(74) *Attorney, Agent, or Firm* — Sughrue Mion, PLLC

(57) ABSTRACT

An ink composition for ink jet recording with excellent ink storage stability, which makes it possible to solve the problems concerning blurring or strike through and perform printing with high density and high image quality, is provided. An ink jet recording method which makes it possible to carry out printing with high density and image quality while causing little strike through, using the ink composition, is also provided.

The ink composition for ink jet recording, contains at least water, a coloring material, a block polymer that has an ethylene oxide moiety and a propylene oxide moiety, and is gelled at 50° C. or higher and 150° C. or lower, and a polymer latex.

7 Claims, No Drawings

INK COMPOSITION FOR INK JET RECORDING AND INK JET RECORDING METHOD USING THE SAME

BACKGROUND OF THE INVENTION

1. Field of the Invention

The present invention relates to an ink composition for ink jet recording and an ink jet recording method using the same.

2. Description of the Related Art

Ink jet recording has many advantages, for example, recording can be carried out at high-speed, there is little noise, coloring is easy, high resolution can be achieved and recording on plain paper can be carried out. As a result of these advantages, equipments and facilities employing this recording method have become remarkably widespread. Regarding the ink used in this recording method, an aqueous ink is the most commonly used in terms of safety, odor, and the like. Further, in the ink jet recording method, images are formed by ejecting thousands of droplets or more of the ink per second.

In the past, aggregation and color bleeding might occur when high-speed printing is carried out by an ink jet recording method. Specifically, the aggregation refers to a phenomenon where a second ink liquid droplet arrives before a first ink liquid droplet is completely absorbed into paper and the two droplets are combined or aggregated together to form a large liquid droplet, which reduces the image resolution. Further, the color bleeding refers to a phenomenon where image sharpness or color quality is degraded as a result of the two liquid droplets to be combined including colorants of different colors.

There has been proposed a method in which ink that is gelled in response to heat is used and printing is carried out on a recording element (paper) that has been heated to a temperature higher than that of the ink for the purpose of the solving of the problems of color bleeding in the high-speed printing (refer to JP2003-285532A). In addition, there has been proposed an aqueous ink for ink jet, which contains a thermally reversible thickening polymer in order to eliminate blurring and color bleeding, and form a high-color development image (refer to JP1997-039381A (JP-H9-039381A)).

SUMMARY OF THE INVENTION

However, there has recently been a stronger demand for suppression of strike through of an ink for ink jet recording. As a result of the investigation conducted by the present inventors, there is an improvement in color bleeding with the techniques described in JP2003-285532A and JP1997-039381A (JP-H9-039381A), but it is necessary to add a large amount of a polymer that is gelled or thickened at a high temperature in order to exert the effect sufficiently. However, due to the increase of the additional amount of the above mentioned polymer, the ejecting performance of the ink is significantly deteriorated in many cases. Specifically, addition of the polymer tends to pull the ink like a thread, and as a result, the ink may not easily become spherical and the latency of the ink may be deteriorated in some cases. This problem is noticeable, for example, in a case where an on-demand type recording is conducted with an ink jet head using a piezo element.

Examples of a method for solving such deterioration of an ejecting property include a method using a urea or a urea derivative as a moisturizer. However, in the case where a large amount of a urea derivative is added to an ink, the urea derivative is decomposed during storage of the ink, and thus, ammonia is generated, the pH of the ink becomes highly alkaline, and the stability of the ink decreases.

The object of the invention is to provide an ink composition for ink jet, in which problems regarding blurring or strike through are improved, and thus, printing with high image density and high image quality can be carried out, and the storage stability of ink is excellent. Further, another object of the invention is to provide an ink jet recording method using the ink composition, by which printing with high density and high image quality can be carried out, while causing little strike through.

The ink composition for ink jet recording of the invention for solving the above-described problems contains at least water, a coloring material, a block polymer that has an ethylene oxide moiety and a propylene oxide moiety, and is gelled at 50° C. or higher and 150° C. or lower, and a polymer latex.

In the invention, an embodiment is preferable in which the gelation temperature of the ink composition for ink jet recording is preferably 50° C. or higher and 120° C. or lower (more preferably 70° C. or higher and 100° C. or lower) and 3% by mass or more of the block polymer is contained in the ink composition.

Further, it is also a preferable embodiment that the coloring material is a coloring pigment and the MFT (minimum film-forming temperature) of the polymer latex is no lower than the gelation temperature of the ink composition for ink jet recording.

The invention includes an ink jet recording method, in which the ink composition for ink jet recording is ejected onto a medium (printing medium) that has been heated to no lower than the gelation temperature of the ink composition for ink jet recording to carry out recording.

The ink composition of the invention makes it possible to carry out printing with high image density and high image quality and also to suppress strike through, when used for ink jet recording. Further, the storage stability of the ink composition is excellent. By the ink jet recording method of the invention using the ink composition, strike through can be suppressed and an image having a good quality can be formed with high density.

DESCRIPTION OF THE PREFERRED EMBODIMENTS

First, the ink composition for ink jet recording of the invention (hereinafter simply referred to an "ink composition" in some cases) will be described.

The ink composition of the invention contains a heat-sensitive material (block polymer) as described later, and has a property of being gelled by heating. The viscosity at 70° C. of the ink composition is preferably 100 mPa·s or higher, and more preferably 150 mPa·s or higher. The upper limit of the viscosity at 70° C. is not particularly limited and is preferably high, but it is usually 10,000 mPa·s or lower. Further, from the viewpoint of, for example, controlling the ejecting property, the viscosity at 25° C. of the ink composition of the invention is preferably 1 to 25 mPa·s, and more preferably 3 to 15 mPa·s. In the invention, the ink composition having a viscosity at 25° C. of 20 mPa·s or lower and a viscosity at 70° C. of 100 mPa·s or higher is preferred, and the ink composition having a viscosity at 25° C. of 20 mPa·s or lower and a viscosity at 70° C. is 200 mPa·s or higher is more preferred. A method of measuring the viscosity in the invention is as follows.

(Method for Measuring Viscosity)

In the invention, unless specifically otherwise mentioned, the viscosity refers to an average of the values measured five times by adjusting the temperature to predetermined ones (25° C. and 70° C.) using a temperature-controlled rotational rheometer (Physica MCR301 available from Anton Paar GmbH) and then measuring the viscosity five times every $100^{th}$ second. It can be presumed that the viscosity obtained by the measurement above can be obtained on a printing medium heated in the recording method of the invention as described later. The measurement condition is one such that the printing speed is 10 (1/s) and the temperature rising rate is 5° C./5 seconds.

In the present specification, the gelation temperature of the ink composition is calculated by carrying out the viscosity measurement as described above while increasing the temperature. The viscosity of the ink usually decreases as the temperature increases, but an increase in the viscosity is observed due to the gelling of the ink. With the measurement temperature set per 5° C., the viscosity measurement is carried out, and the temperature showing the increase in the viscosity relative to the previous measurement (specifically the temperature when the viscosity of the ink composition becomes 50 mPa·s or higher) is referred to as the "gelation temperature" of the ink composition. The gelation temperature of the ink composition of the invention is preferably 50° C. or higher and 120° C. or lower, and more preferably 70° C. or higher and 100° C. or lower.

The gelling behavior of the ink composition of the invention is presumed to be as follows. The heat-sensitive material in the ink composition is a polymer compound that is dissociated and dissolved, or associated and thickened at a certain transition temperature. Therefore, in case of heating the polymer compound when dissolved by hydration, the polymer compound is dehydrated to interact with each other. And the interaction presumably causes the ink composition to be gelled.

By using at least one kind of heat-sensitive material having such properties, the ink composition of the invention can suppress aggregation of the ink liquid droplet and color bleeding in the high-speed printing.

Furthermore, in the case where dots are formed using the ink composition by an ink jet recording method, evaporation of a solvent occurs after an increase in the viscosity by gel transition, the cross-sectional shape of the dot will be trapezoidal or concave, but in terms of uniformity of the density, a trapezoidal shape is preferred. In the ink composition of the invention, the shape of the dot formed is favorable, and correspondingly, the printing quality is improved.

[Heat-Sensitive Material]

The ink composition of the invention contains a heat-sensitive material that shows a gelling effect by heat. As the heat-sensitive material, a polymer is preferably used. Examples of the polymer include a block polymer having an ethylene oxide moiety and a propylene oxide moiety. Specific examples of the block polymer include a diblock polymer of polyethylene oxide-polypropylene oxide (PEO-PPO), a triblock copolymer of polyethylene oxide-polypropylene oxide-polyethylene oxide (PEO-PPO-PEO), and the like, and a triblock copolymer of PEO-PPO-PEO is particularly preferred. Among the block polymers, PEO is preferably contained in an amount of 10 to 99% by mass, more preferably 40 to 95% by mass, and particularly preferably 60 to 90% by mass. The proportion (molar ratio) of PPO to PEO is preferably in the range of 1:99 to 50:50, more preferably in the range of 10:90 to 50:50, and particularly preferably in the range of 20:80 to 50:50.

The average molecular weight of the block polymer is preferably 1000 to 100,000, and more preferably 8000 to 30,000. When the average molecular weight is less than 1000, it is difficult to exert a gelling effect when the ink composition is heated, and it is difficult to improve the blurring or strike through. Further, when the average molecular weight is more than 100,000, there are some cases where the solubility of the block polymer in the ink composition is lowered; and when the ink composition is dried on the nozzle surface, the block polymer is precipitated, and an ejecting property is lowered, for example, nozzles are clogged with the ink composition and the ejecting direction is significantly distorted.

Furthermore, in the invention, the molecular weight refers to a number average molecular weight unless specifically otherwise mentioned, and means a value measured by the following measurement method.

(Method for Measuring Molecular Weight)

The molecular weight is measured using a GPC (gel permeation chromatography) method unless specifically otherwise mentioned. The gel charged into the column used in the GPC method is preferably a gel having an aromatic compound as a repeating unit, and examples thereof include a gel including styrene-divinylbenzene copolymers. The column is preferably used in the form where 2 to 6 columns are connected. Examples of the solvent used include ether-based solvents such as tetrahydrofuran and the like, and amide-based solvents such as N-methylpyrrolidinone and the like, and ether-based solvents such as tetrahydrofuran and the like are preferred. The measurement is preferably carried out at a flow rate of the solvent in the range of 0.1 to 2 mL/min, and most preferably in the range of 0.5 to 1.5 mL/min. By carrying out the measurement within these ranges, there is no occurrence of loading in an apparatus, and thus, the measurement can be carried out further efficiently. The measurement temperature is preferably carried out at 10 to 50° C., and most preferably 20 to 40° C.

Specific conditions for the molecular weight measurement are shown below.

Apparatus: HLC-8220 GPC (available from Tosoh Corporation)

Detector: Differential refractometer (RI detector)

Columns for a sample: The following two columns are directly connected (both available from Tosoh Corporation)

TSK GUARD COLUMN MP (XL) 6 mm×40 mm

TSK-GEL Multipore-HXL-M 7.8 mm×300 mm

Columns for a reference: The same as those for the columns for the sample

Thermostatic bath temperature: 40° C.

Mobile phase: Tetrahydrofuran

Mobile phase flow rate of a sample: 1.0 mL/minute

Mobile phase flow rate of a reference: 0.3 mL/minute

Sample concentration: 0.1% by mass

Injection amount of sample: 100 µL

Data collection time: 16 minutes to 46 minutes after sample injection

Sampling pitch: 300 msec

As the triblock copolymer of PEO-PPO-PEO, NEWPOL (registered trademark) PE-78 (available from Sanyo Chemical industures, Ltd.), PLUONIC (registered trademark) P85 (available from BASF Corp.), NEWPOL PE-62 (available from Sanyo Chemical industures, Ltd.), NEWPOL PE-64 (available from Sanyo Chemical industures, Ltd.), NEWPOL PE-68 (available from Sanyo Chemical industures, Ltd.), NEWPOL PE-74 (available from Sanyo Chemical industures, Ltd.), NEWPOL PE-75 (available from Sanyo Chemical industures, Ltd.), NEWPOL PE-108 (available from Sanyo Chemical industures, Ltd.), NEWPOL PE-128 (available from Sanyo Chemical industures, Ltd.), PLUONIC L62 (available from BASF Corp.), PLUONIC F87 (available from BASF Corp.), polyethylene glycol-block polypropylene glycol-block polyethylene glycol (available from Aldrich), and the like are commercially available.

The addition amount of the heat-sensitive material is not particularly limited as long as the viscosity is reduced in order to eject the ink composition from the head of a recording apparatus while obtaining a gelling effect of the ink composition by heating sufficiently (that is, the ink composition has the viscosity at 70° C. of the predetermined value as above). However, the content of the heat-sensitive material in the ink composition is preferably 2% by mass or more, more preferably 3% by mass to 20% by mass, and particularly preferably 5 to 15% by mass. With a content of the heat-sensitive material of less than 2% by mass, there are some cases where the gelling effect of the ink composition by heating cannot be sufficiently obtained. Further, with a content of the heat-sensitive material of more than 20% by mass, the viscosity (gelling property) of the ink composition before heating increases too high, and as a result, there are some cases where the ejecting from a head of a recording apparatus is impaired.

The heat-sensitive material in the invention may be used in combination of two or more kinds thereof. In this case, it is preferable that the content be within these ranges in total.

In addition, the heat-sensitive material in the invention preferably exists in the state of being dissolved in the ink composition.

The gelation temperature of the heat-sensitive material used in the invention is preferably 50° C. or higher (more preferably 80° C. or higher), and more preferably 150° C. or lower (more preferably 130° C. or lower). In the invention, as the gelation temperature of the heat-sensitive material, the value described in a manufacturer's catalog or the like as a cloud point of a polymer can be usually used, but in the case where the cloud point of the polymer is not clear, it is also possible to measure the gelation temperature in practice according to a method described below.

(Method for Measuring Gelation Temperature)

When a temperature of 1% aqueous solution of a heat-sensitive material is raised, the temperature at which the solution becomes cloudy is taken as a gelation temperature of the heat-sensitive material.

[Polymer Latex]

The ink composition of the invention contains a polymer latex. Since the polymer latex is present in the ink, in the case that the ink composition is warmed to cause a gelling reaction of the heat-sensitive material, the hydrophobic site of the polymer latex and the hydrophobic site of the heat-sensitive material bring about a hydrophobic interaction such as a van der Waals force and the like to increase the viscosity of the ink composition, and thus, the gelling reaction of the ink composition can be effectively undergone. Therefore, the amount of the heat-sensitive material or the urea derivative can be reduced, and accordingly, a desired effect can be obtained without deteriorating the ejecting property or the storage stability of the ink composition.

Such polymer latex is not particularly limited as long as it has stable dispersibility in the ink composition and promotes the gelling action of the heat-sensitive material while heating the ink composition, but the minimum film-forming temperature (MFT) of the polymer latex is more preferably adjusted to no lower than the gelation temperature of the ink composition. For example, the minimum film-forming temperature (MFT) of the polymer latex is preferably 70 to 150° C., and more preferably 90 to 130° C.

In the case where the minimum film-forming temperature (MFT) of the polymer latex is lower than the gelation temperature of the ink composition, gelling of the ink composition and film formation of the polymer latex proceed at the same time when the ink composition is ejected onto the printing medium that has been heated. As a result, penetration of the ink composition that is ejected later into the printing medium is extremely inhibited, and thus, drying of the ink composition becomes insufficient in some cases. This phenomenon is prominent particularly in high-speed printing. Further, in the case that the minimum film-forming temperature (MFT) is too high, for example, higher than 150° C., the heating temperature required for film forming of the polymer latex to provide scratch resistance of the image is too high. In this case, shrinkage of the printing medium or the like may be causes, which is thus not preferred. Further, in the case where the organic solvent contained in the ink composition has an effect of lowering the minimum film-forming temperature (MFT) of the polymer latex, there is no particular problem even when the minimum film-forming temperature (MFT) of the polymer latex itself is higher than 150° C.

The polymer latex in the invention may be any one of a thermoplastic resin, a thermosetting resin, and a thermal denaturation resin. Specific examples thereof include an acryl-based resin, an epoxy-based resin, a polyurethane-based resin, a polyether-based resin, a polyamide-based resin, an unsaturated polyester-based resin, a phenol-based resin, a silicone-based resin, and a fluoro-based resin; a polyvinyl-based resin such as polyvinyl chloride, polyvinyl acetate, polyvinyl alcohol, polyvinyl butyral, and the like; a polyester-based resin such as an alkyd resin, a phthalic acid resin, and the like; an amino-based resin such as a melamine resin, a melamine formaldehyde resin, an amino alkyd co-condensed resin, a urea formaldehyde resin, a urea resin, and the like; copolymers or mixtures of two or more of these resins; and the like. Among these, a resin having an anionic group is preferred. An acryl-based resin having an anionic group can be obtained, for example, by polymerizing, in a solvent, an acrylic monomer having an anionic group (anionic group-containing acrylic monomer), and if necessary, other monomers copolymerizable with the anionic group-containing acrylic monomer in a solvent. Examples of the anionic group-containing acrylic monomer include an acrylic monomer having one or more anionic groups selected from the group consisting of a carboxyl group, a sulfonic acid group, and a phosphonic group. Among these, an acrylic monomer having a carboxyl group (for example, acrylic acid, methacrylic acid, crotonic acid, methacrylic acid, propylacrylic acid, isopropylacrylic acid, itaconic acid, fumaric acid, and the like) is preferred, and acrylic acid or methacrylic acid is particularly preferred.

The polymer latex in the invention is preferably a self-dispersing polymer latex, and more preferably a self-dispersing polymer latex having a carboxyl group, from the viewpoint of ejecting stability and stability of the liquid (particularly, dispersion stability) when using a coloring material (particularly a pigment). The self-dispersing polymer latex means a latex of a water-insoluble polymer that does not contain a free emulsifier and that can get into a dispersed state in an aqueous medium even in the absence of other surfactants due to a functional group (particularly, an acidic group or a salt thereof) that the polymer itself has.

The "dispersed state" as used herein includes both of an emulsified state (emulsion) in which a water-insoluble polymer in the liquid state is dispersed in an aqueous medium and a dispersed state (suspension) in which a water-insoluble polymer in the solid state is dispersed in an aqueous medium.

In the invention, it is preferable to use a water-insoluble polymer that can be in a suspended state.

The dispersion state of the self-dispersing polymer latex is defined as follows: 30 g of a water-insoluble polymer is dissolved in 70 g of an organic solvent (for example, methyl ethyl ketone) to form a solution, the solution is mixed with 200 g of water and a neutralizing agent that can neutralize the salt-forming groups of the water-insoluble polymer to a degree of 100% (the neutralizing agent being sodium hydroxide when the salt-forming groups are anionic, or acetic acid when the salt-forming groups are cationic), the mixture is stirred with a stirrer having a stirring blade at a rotation rate of 200 rpm at 25° C. for 30 minutes, and the organic solvent is removed from the mixture liquid. When a stable dispersion state of the water-insoluble polymer in the mixture liquid is confirmed by visual observation at 25° C. for at least one week after the removal of the organic solvent, the water-insoluble polymer is considered to be a self-dispersing polymer.

Furthermore, the water-insoluble polymer refers to a polymer in which when 20 g of the polymer is dried at 105° C. for 2 hours, and dissolved in 100 g of water at 25° C., the amount of dissolution is 10 g or less, and the amount of dissolution is preferably 5 g or less, and more preferably 1 g or less. The amount of dissolution is the dissolution amount when 100% neutralized with sodium hydroxide or acetic acid, depending on the kind of salt-forming group of the water-insoluble polymer.

The aqueous medium may contain water and, if necessary, a hydrophilic organic solvent. In the present invention, the aqueous medium is preferably formed by water and a hydrophilic organic solvent whose amount is 0.2% by mass or less with respect to the water, and is more preferably formed by water only.

The main chain backbone of the water-insoluble polymer is not particularly limited and, for example, a vinyl polymer (acrylic esters, methacrylic esters, vinyl esters, acrylamides, methacrylic amides, olefins, vinyl ethers, and the like), or a condensation polymer (epoxy resins, polyesters, polyurethanes, polyamides, celluloses, polyethers, polyureas, polyimides, polycarbonates, and the like) may be used. Among these, vinyl-based polymers are particularly preferred.

Preferable examples of the vinyl-based polymer and the monomer constituting the vinyl-based polymer include those described in JP2001-181549A and JP2002-88294A. Further, a vinyl-based polymer may be used which has a dissociative group introduced to the terminal of the polymer chain; the dissociative group may be introduced by using a chain transfer agent, a polymerization initiator, or an initiator that has a dissociative group (or a substituent that can be converted to the dissociative group) for radical polymerization of a vinyl monomer, or by using a compound having the dissociative group (or a substituent that can be converted to the dissociative group) as either of an initiator or a terminator for ion polymerization.

Further, preferable examples of the condensed polymer and the monomer constituting the condensed polymer include those described in JP2001-247787A.

In the invention, it is preferable to use a water-insoluble polymer having a hydrophilic structural unit and a hydrophobic structural unit derived from an aromatic group-containing monomer as the self-dispersing polymer latex, from the viewpoint of the self-dispersibility.

The hydrophilic structural unit is not particularly limited as long as it derives from a hydrophilic group-containing monomer. The hydrophilic structural unit may derive from only one type of hydrophilic group-containing monomer or two or more types of hydrophilic group-containing monomer. The hydrophilic group is not particularly limited, and may be a dissociative hydrophilic group or a nonionic hydrophilic group.

In the invention, the hydrophilic group is preferably a dissociative group, and more preferably an anionic dissociative group, from the viewpoints of promotion of the self-dispersibility and provision of the stability of the formed emulsion or dispersion state. Examples of the anionic dissociative group include a carboxyl group, a phosphoric acid group, a sulfonic acid group, and the like. Among these, a carboxyl group is preferable from the viewpoint of the fixability at the time when an ink composition is formed.

The hydrophilic group-containing monomer in the invention is more preferably a dissociative hydrophilic group-containing monomer containing a dissociative group and an ethylenically unsaturated bond, from the viewpoint of the self-dispersibility.

Examples of the dissociative hydrophilic group-containing monomer include an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxymethylsuccinic acid, and the like. Specific examples of the unsaturated sulfonic acid monomer include styrenesulfonic acid, 2-acrylamide-2-methylpropanesulfonic acid, 3-sulfopropyl(meth)acrylate, bis-(3-sulfopropyl)itaconic ester, and the like. Specific examples of the unsaturated phosphoric acid monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, dibutyl-2-acryloyloxyethyl phosphate, and the like.

Among the above dissociative hydrophilic group-containing monomers, unsaturated carboxylic acid monomers are preferable, acryl-based monomers are more preferable, and acrylic acid and methacrylic acid are particularly preferable, from the viewpoint of dispersion stability and ejecting stability.

The self-dispersing polymer latex in the invention preferably contains a polymer having a carboxyl group from the viewpoint of self-dispersibility, and more preferably a polymer having a carboxyl group and having an acid value (mgKOH/g) of 25 to 100. In particular, with an acid value of 25 or more, the dispersion stability becomes favorable.

The aromatic group-containing monomer is not particularly limited as long as the monomer is a compound containing an aromatic group and a polymerizable group. The aromatic group may be a group derived from an aromatic hydrocarbon or from an aromatic heterocycle. In the invention, the aromatic group is preferably an aromatic group derived from an aromatic hydrocarbon, from the viewpoint of the stability of the particle shape in an aqueous medium.

Further, the polymerizable group may be a polycondensation-polymerizable group or an addition-polymerizable group. In the present invention, the polymerizable group is preferably an addition-polymerizable group, and more preferably a group containing an ethylenically unsaturated bond, from the viewpoint of the stability of the particle shape in an aqueous medium.

Examples of the aromatic group-containing monomer in the invention include an aromatic group-containing (meth) acrylic resin including a structural unit derived from an aromatic group-containing (meth)acrylate monomer, and a monomer having an aromatic group derived from an aromatic hydrocarbon and an ethylenically unsaturated bond. The aromatic group-containing monomer may be used alone or in a combination of two or more kinds thereof.

Examples of the aromatic group-containing monomer include phenoxyethyl(meth)acrylate, benzyl(meth)acrylate, phenyl(meth)acrylate, a styrene-based monomer, and the like. Among them, from the viewpoint of the balance between the hydrophilicity and the hydrophobicity of the polymer chain and the fixability of the ink composition, an aromatic group-containing (meth)acrylate monomer is preferred, and at least one selected from phenoxyethyl(meth)acrylate, benzyl(meth)acrylate, or phenyl(meth)acrylate is more preferable, and phenoxyethyl(meth)acrylate and benzyl(meth)acrylate are even more preferred.

Moreover, in the present specification, the "(meth)acrylate" means acrylate or methacrylate.

The self-dispersing polymer latex in the invention preferably includes a structural unit derived from an aromatic group-containing (meth)acrylate monomer at a content of 10 to 95% by mass. When the content of the aromatic group-containing (meth)acrylate monomer is 10 to 95% by mass, stability of the dispersion state of the polymer latex is improved, and, further, increase in the viscosity of the ink composition can be suppressed.

In the present invention, the content of the aromatic group-containing (meth)acrylate monomer is more preferably 15 to 90% by mass, even more preferably 15 to 80% by mass, and particularly preferably from 25 to 70% by mass, from the viewpoints of the stability of the self-dispersing state of the polymer latex, stabilization of the particle shape in an aqueous medium through hydrophobic interaction between aromatic rings, and reduction of the amount of water-soluble components in the polymer latex by conducting appropriate hydrophobicity.

The self-dispersing polymer latex in the invention may include other structural units, if necessary, in addition to the structural unit derived from the aromatic group-containing monomer and the structural unit derived from the dissociative hydrophilic group-containing monomer.

The additional monomer forming the structural unit is not particularly limited as long as it is a monomer capable of being copolymerized with the aromatic group-containing monomer or the dissociative hydrophilic group-containing monomer. Among them, an alkyl group-containing monomer is preferred from the viewpoints of the flexibility of the polymer backbone and ease of controlling the glass transition temperature (Tg).

Examples of the alkyl group-containing monomer include (meth)acryl ester-based monomers, for example, alkyl(meth)acrylates such as methyl(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, ethylhexyl(meth)acrylate, and the like, dialkylaminoalkyl(meth)acrylates such as dimethylaminoethyl(meth)acrylate, and the like, hydroxyl group-containing ethylenically unsaturated monomers such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, hydroxyhexyl(meth)acrylate, and the like, and dialkylaminoalkyl(meth)acrylates such as dimethylaminoethyl(meth)acrylate, and the like; and (meth)acrylamide-based monomers, for example, N-hydroxyalkyl(meth)acrylamides such as N-hydroxymethyl(meth)acrylamide, N-hydroxyethyl(meth)acrylamide, N-hydroxybutyl(meth)acrylamide, and the like, and N-alkoxyalkyl(meth)acrylamides such as N-methoxymethyl(meth)acrylamide, N-ethoxymethyl(meth)acrylamide, N-(n-,iso)butoxymethyl(meth)acrylamide, N-methoxyethyl(meth)acryl amide, N-ethoxyethyl(meth)acrylamide, N-(n-, iso)butoxyethyl (meth)acrylamide, and the like.

The molecular weight of the water-insoluble polymer constituting the self-dispersing polymer latex in the invention is preferably in the range from 3000 to 200,000, more preferably in the range from 5000 to 150000, and even more preferably in the range from 10,000 to 100,000, in terms of weight average molecular weight. When the weight average molecular weight is 3000 or more, the amount of water-soluble component in the polymer latex can be effectively reduced. When the weight average molecular weight is 200,000 or less, the self-dispersibility of the polymer latex can be improved.

Furthermore, the weight average molecular weight is measured by means of gel permeation chromatography (GPC). For GPC, HLC-8020 GPC (available from Tosoh Corporation) is used; as the columns, TSKgel Super HZM-H, TSKgel Super HZ4000, and TSKgel Super HZ200 (all available from Tosoh Corporation, 4.6 mmID×15 cm) are used by connecting these three columns together in series; and as an eluent, THF (tetrahydrofuran) is used. Regarding the conditions, the sample concentration is 0.45% by mass, the flow rate is 0.35 ml/min, the sample injection amount is 10 μl, and the measurement temperature is 40° C., and detection is performed by using an IR detector. Further, the calibration curve is prepared from the following eight samples: "Standard Sample TSK STANDARD POLYSTYRENE": "F-40", "F-20", "F-4", "F-1", "A-5000", "A-2500", "A-1000", and "n-propyl benzene", all available from Tosoh Corporation.

Furthermore, from the viewpoint of controlling the hydrophobicity of the polymer, the water-insoluble polymer constituting the self-dispersing polymer latex preferably contains a structural unit derived from an aromatic group-containing (meth)acrylate monomer at a copolymerization ratio of 15 to 80% by mass, a structural unit derived from a carboxyl group-containing monomer, and a structural unit derived from an alkyl group-containing monomer (preferably a structural unit derived from an alkyl(meth)acrylate ester), and more preferably contains a structural unit derived from phenoxyethyl(meth)acrylate and/or a structural unit derived from benzyl(meth)acrylate at a copolymerization ratio of 15 to 80% by mass, a structural unit derived from a carboxyl group-containing monomer, and a structural unit derived from an alkyl group-containing monomer (preferably a structural unit derived from a (meth)acrylic ester of an alkyl having 1 to 4 carbon atoms); further it is preferable that the acid value of the water-insoluble polymer be 25 to 100 and the weight average molecular weight of the water-insoluble polymer be 3000 to 200,000, and it is more preferable that the acid value be 25 to 95 and the weight average molecular weight be from 5000 to 150,000.

Compounds B-01 to B-19 are shown below, which are specific examples of the water-insoluble polymer constituting the self-dispersing polymer latex. However, the invention is not limited to thereto. Further, the numbers in the parentheses indicate mass ratios of copolymerization components.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/methacrylic acid copolymer (50/44/6)

B-04: Phenoxyethyl acrylate/methyl methacrylate/ethyl acrylate/acrylic acid copolymer (30/55/10/5)

B-05: Benzyl methacrylate/isobutyl methacrylate/methacrylic acid copolymer (35/59/6)

B-06: Styrene/phenoxyethyl acrylate/methyl methacrylate/acrylic acid copolymer (10/50/35/5)

B-07: Benzyl acrylate/methyl methacrylate/acrylic acid copolymer (55/40/5)

B-08: Phenoxyethyl methacrylate/benzyl acrylate/methacrylic acid copolymer (45/47/8)

B-09: Styrene/phenoxyethyl acrylate/butyl methacrylate/acrylic acid copolymer (5/48/40/7)

B-10: Benzyl methacrylate/isobutyl methacrylate/cyclohexyl methacrylate/methacrylic acid copolymer (35/30/30/5)

B-11: Phenoxyethyl acrylate/methyl methacrylate/butyl acrylate/methacrylic acid copolymer (12/50/30/8)

B-12: Benzyl acrylate/isobutyl methacrylate/acrylic acid copolymer (93/2/5)

B-13: Styrene/phenoxyethyl methacrylate/butyl acrylate/acrylic acid copolymer (50/5/20/25)

B-14: Styrene/butyl acrylate/acrylic acid copolymer (62/35/3)

B-15: Methyl methacrylate/phenoxyethyl acrylate/acrylic acid copolymer (45/51/4)

B-16: Methyl methacrylate/phenoxyethyl acrylate/acrylic acid copolymer (45/49/6)

B-17: Methyl methacrylate/phenoxyethyl acrylate/acrylic acid copolymer (45/48/7)

B-18: Methyl methacrylate/phenoxyethyl acrylate/acrylic acid copolymer (45/47/8)

B-19: Methyl methacrylate/phenoxyethyl acrylate/acrylic acid copolymer (45/45/10)

The method for preparing the water-insoluble polymer constituting the self-dispersing polymer latex is not particularly limited, and examples thereof include a method including performing emulsion polymerization in the presence of a polymerizable surfactant so as to covalently bond the surfactant to the water-insoluble polymer and a method including copolymerizing a monomer mixture containing the hydrophilic group-containing monomer and the aromatic group-containing monomer by a known polymerization process such as a solution polymerization method, a bulk polymerization method, and the like. Among the above polymerization methods, a solution polymerization is preferred, and a solution polymerization method using an organic solvent is more preferred, from the viewpoints of the dispersion stability of the latex produced and the droplet ejection stability of the ink composition.

The self-dispersing polymer latex in the invention preferably includes a polymer synthesized in an organic solvent, wherein the polymer has carboxyl groups, all or some of the carboxyl groups of the polymer are neutralized (to give an acid value of preferably from 20 to 100), and the polymer is prepared in the form of a polymer dispersion in which water constitutes the continuous phase. In other words, the preparation of the self-dispersing polymer latex preferably includes a step of synthesizing a polymer in an organic solvent and a dispersing step of forming a water-soluble dispersion in which at least some of the carboxyl groups of the polymer are neutralized.

The dispersion step preferably includes the following substeps (1) and (2):

Substep (1): a step of mixing and stirring a polymer (water-insoluble polymer), an organic solvent, a neutralizing agent, and an aqueous medium Substep (2): a step of removing the organic solvent from the mixed liquid The substep (1) is preferably a treatment in which the polymer (water-insoluble polymer) is dissolved in the organic solvent, and then the neutralizing agent and the aqueous medium are gradually added to and mixed with the polymer solution to form a dispersion. When the neutralizing agent and the aqueous medium are added to the water-insoluble polymer solution in which the water-insoluble polymer is dissolved in the organic solvent as in the above process, self-dispersing polymer particles whose diameter is highly stable during storage can be obtained without requiring a strong shearing force.

The method of stirring the solution, the neutralizing agent, and the like is not particularly limited, and may be a generally-used mixing and stirring apparatus, or if necessary, a disperser such as an ultrasonic disperser, a high-pressure homogenizer, and the like can be used.

Preferable examples of the organic solvent include an alcohol-based solvent, a ketone-based solvent, and an ether-based solvent.

Examples of the alcohol-based solvent include isopropyl alcohol, n-butanol, t-butanol, ethanol, and the like. Examples of the ketone-based solvent include acetone, methyl ethyl ketone, diethyl ketone, methyl isobutyl ketone, and the like. Examples of the ether-based solvent include dibutyl ether, dioxane, and the like. Among these solvents, ketone-based solvents such as methyl ethyl ketone and the like and alcohol-based solvents such as isopropyl alcohol and the like are preferred. It is also preferable to use isopropyl alcohol and methyl ethyl ketone in a combination for the purpose of making the polarity change milder at the time of phase inversion from an oil phase to a water-soluble phase. The combination use of the solvents makes it possible to obtain self-dispersing polymer latices having a very small particle diameter, which are free from aggregation precipitation or fusion between the self-dispersing polymer latices and having high dispersion stability.

The neutralizing agent is used to neutralize all or some of the dissociative hydrophilic groups of the polymer so as to allow the self-dispersing polymer to get into a stable emulsion or dispersion state in water. When the self-dispersing polymer in the invention has an anionic dissociative group (for example, a carboxyl group) as a dissociative hydrophilic group, the neutralizing agent to be used may be a basic compound such as an organic amine compound, ammonia, an alkali metal hydroxide, and the like. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, triisopropanolamine, and the like. Examples of the alkali metal hydroxide include lithium hydroxide, sodium hydroxide, potassium hydroxide, and the like. Among them, sodium hydroxide, potassium hydroxide, triethylamine, and triethanolamine are preferable from the viewpoint of the dispersion stability of the self-dispersing polymer latex in water.

The amount of the basic compound to be used is preferably from 5 to 120% by mole, more preferably from 10 to 110% by mole, and even more preferably from 15 to 100% by mole, with respect to 100% by mole of the dissociative hydrophilic group. When the amount of the basic compound is 5% by mole or more, an effect of stabilizing the dispersion of the latex in water can be obtained. When the amount of the basic compound is 120% by mole or less, an effect of reducing the water-soluble component in the self-dispersing polymer latex can be obtained.

Examples of the aqueous medium used in the substep (1) include water and a mixed solvent of water and an organic solvent (ketones, acetic esters, alcohols, and ethers).

In the substep (2), the organic solvent is removed from the dispersion obtained in the substep (1) by a common method such as distillation and the like under reduced pressure, whereby phase inversion into a water-soluble system occurs and a water-soluble dispersion of the self-dispersing polymer latex is obtained. The organic solvent has been substantially removed from the obtained water-soluble dispersion, and the amount of the remaining organic solvent is preferably 0.2% by mass or less, and more preferably 0.1% by mass or less.

The volume average particle diameter of the polymer latices (particularly self-dispersing polymer latices) is preferably in the range from 10 to 400 nm, more preferably in the range from 10 to 200 nm, even more preferably from 10 nm to 100 nm, and particularly preferably from 10 nm to 50 nm, in terms of volume average particle diameter. When the volume average particle diameter of the polymer latices is 10 nm or more, the production suitability is improved, whereas when the volume average particle diameter of the polymer latices is 400 nm or less, storage stability is improved. The particle diameter distribution of the polymer latices is not particularly limited, and may be a wide particle diameter distribution or a monodispersed particle diameter distribution. It is possible to use a mixture of two or more types of water-insoluble particles. It is also possible to use a mixture of two or more types of resin particles each having a monodispersed particle diameter distribution.

The average particle diameter and particle diameter distribution of the polymer latices are obtained by measuring the diameters of the particles by a dynamic light scattering method using a NANOTRAC particle size distribution analyzer UPA-EX150 (available from Nikkiso Co., Ltd.).

The content of the polymer latex (in particular, the self-dispersing polymer latex) in the ink composition (liquid composition) is preferably 1 to 30% by mass, and more preferably 3 to 10% by mass, in terms of a solid content, from the viewpoint of glossiness of an image or the like. In the case where the content of the polymer latex is less than 1% by mass, the gelling effect of the ink becomes insufficient, and thus, the print density is reduced or the strike through is deteriorated in some cases. Further, if the content of the polymer latex is more than 30% by mass, the ejecting property of the ink may be deteriorated in some cases.

In the invention, two or more kinds of polymer latices (in particular, self-dispersing polymer latices) having different average particle diameters or particle diameter distributions may be mixed and used.

[Coloring Material]

In the ink composition used in the invention, a usually used coloring material can be used without being particularly limited. Among these, from the viewpoint of colorability of the ink composition, a pigment that is usually insoluble in water or sparingly soluble in water is preferred. In addition, in the invention, a water-insoluble pigment itself or a water-insoluble pigment that has been surface-treated with a dispersant may be used as a coloring material.

The type of the pigment in the invention is not particularly limited, and usually used organic pigments and inorganic pigments may be used. Examples thereof include polycyclic pigments such as an azo lake pigment, an azo pigment, a phthalocyanine pigment, a perylene pigment, a perynone pigment, an anthraquinone pigment, a quinacridone pigment, a dioxazine pigment, a diketopyrrolopyrrole pigment, a thioindigo pigment, an isoindolinone pigment, a quinophthalone pigment, and the like; dye lakes such as a basic dye lake, an acidic dye lake, and the like; organic pigments such as a nitro pigment, a nitroso pigment, aniline black, a daylight fluorescent pigment, and the like; and inorganic pigments such as a titanium oxide pigment, an iron oxide-based pigment, a carbon black-based pigment, and the like. Further, pigments that can be dispersed in an aqueous phase may be used even if they are not described in the Color Index. In addition, pigments obtained by subjecting the above-described pigments to surface treatment with a surfactant, a polymer dispersant, or the like; grafted carbon; and the like can also be used. Among these pigments, an azo pigment, a phthalocyanine pigment, an anthraquinone pigment, a quinacridone pigment, and a carbon black-based pigment are preferred. As the coloring material of the black ink composition, a carbon black-based pigment is particularly preferably used.

Specific examples of the organic pigments used in the invention are described below.

Examples of organic pigments for orange or yellow include C.I. Pigment•Orange 31, C.I. Pigment•Orange 43, C.I. Pigment•Yellow 12, C.I. Pigment•Yellow 13, C.I. Pigment•Yellow 14, C.I. Pigment•Yellow 15, C.I. Pigment•Yellow 17, C.I. Pigment•Yellow 74, C.I. Pigment•Yellow 93; C.I. Pigment•Yellow 94, C.I. Pigment•Yellow 128, C.I. Pigment•Yellow 138, C.I. Pigment•Yellow 151, C.I. Pigment•Yellow 155, C.I. Pigment•Yellow 180, C.I. Pigment•Yellow 185, and the like.

Examples of organic pigments for magenta or red include C.I. Pigment•Red 2, C.I. Pigment•Red 3, C.I. Pigment•Red 5, C.I. Pigment•Red 6, C.I. Pigment•Red 7, C.I. Pigment•Red 15, C.I. Pigment•Red 16, C.I. Pigment•Red 48:1, C.I. Pigment•Red 53:1, C.I. Pigment•Red 57:1, C.I. Pigment•Red 122, C.I. Pigment•Red 123, C.I. Pigment•Red 139, C.I. Pigment•Red 144, C.I. Pigment•Red 149, C.I. Pigment•Red 166, C.I. Pigment•Red 177, C.I. Pigment•Red 178, C.I. Pigment•Red 222, C.I. Pigment•Violet 19, and the like.

Examples of organic pigments for green or cyan include C.I. Pigment•Blue 15, C.I. Pigment•Blue 15:2, C.I. Pigment•Blue 15:3, C.I. Pigment•Blue 15:4, C.I. Pigment•Blue 16, C.I. Pigment•Blue 60, C.I. Pigment•Green 7, aluminum phthalocyanine pigments crosslinked with siloxane such as those described in U.S. Pat. No. 4,311,775, and the like.

Examples of organic pigments for black include C.I. Pigment•Black 1, C.I. Pigment•Black 6, C.I. Pigment•Black 7, and the like.

The coloring material preferably has an average particle diameter of from 10 to 200 nm, more preferably from 10 to 150 nm, and further preferably from 10 to 100 nm. When the average particle diameter is 200 nm or less, color reproducibility is favorable and, in the case of an ink jet method, droplet ejecting properties are favorable. Further, when the average particle diameter is 10 nm or more, light resistance is favorable. The particle size distribution of the coloring material is not particularly limited, and may be either a wide particle size distribution or a monodisperse particle size distribution. There may be an embodiment, in which a mixture of two or more of coloring materials having monodisperse particle size distributions is used.

Further, the average particle diameter and the particle size distribution of the coloring material can be determined by measuring the volume average particle diameter by a dynamic light scattering method using a particle size distribution measuring apparatus NANOTRACK UPA-EX150 (available from Nikkiso Co., Ltd.).

From the viewpoint of image density, the content of the coloring material in the ink composition is preferably 1 to 25% by mass, more preferably from 2 to 20% by mass, further preferably from 5 to 20% by mass, and particularly preferably from 5 to 15% by mass, based on the mass of the ink composition.

[Dispersant, Dispersion Medium]

Generally, a dispersant is a material that is added for the purpose of dispersing the coloring material, and a dispersion medium (binder) is a material that is added for the purpose of improving scratch resistance, solvent resistance, water resistance, and the like of an image. In the invention, the materials described below as a dispersant may be added as a dispersion medium, and both of them will be integrally explained as a dispersant.

It is preferable that the coloring material is dispersed in an aqueous solvent by a dispersant. The dispersant may be a polymer dispersant or a surfactant-type dispersant. Further, the polymer dispersant may be either a water-soluble dispersant or a water-insoluble dispersant.

The surfactant-type dispersant is added for the purpose of stably dispersing the coloring material in an aqueous solvent, while maintaining the viscosity of the ink composition at a low level. The surfactant-type dispersant as mentioned herein is a dispersant having a weight average molecular weight of 2000 or less, which has a lower molecular weight than the polymer dispersant. Further, the weight average molecular weight of the surfactant-type dispersant is preferably 100 to 2000, and more preferably 200 to 2000.

As a water-soluble dispersant in the polymer dispersant, a hydrophilic polymer compound can be used. Examples thereof include natural hydrophilic polymer compounds, for example, plant polymers such as gum arabic, gum tragacanth, guar gum, gum karaya, locust bean gum, arabinogalactan, pectin, quince seed starch, and the like; algae polymers such as alginic acid, carrageenan, agar, and the like; animal polymers such as gelatin, casein, albumin, collagen, and the like; and microbial polymers such as xanthene gum, dextran, and the like.

Examples of the water-soluble dispersant include chemically-modified hydrophilic polymer compounds obtained using a natural product as a raw material, for example, cellulose-based polymers such as methyl cellulose, ethyl cellulose, hydroxyethyl cellulose, hydroxypropyl cellulose, carboxymethyl cellulose, and the like; starch-based polymers such as sodium starch glycolate, sodium starch phosphate, and the like; and algae-based polymers such as propylene glycol alginate and the like.

Further examples of the water-soluble dispersant include synthetic water-soluble polymer compounds, for example, vinyl-based polymers such as polyvinyl alcohol, polyvinyl pyrrolidone, polyvinyl methyl ether, and the like; (meth)acryl-based resins such as poly(meth)acrylamide, poly(meth)acrylic acid and alkali metal salts thereof, a water-soluble styrene (meth)acrylic resin and water-soluble vinylnaphthalene (meth)acryl resin, and the like; maleic acid-based copolymerization resins such as a water-soluble styrene maleic acid resin, and a water-soluble vinylnaphthalene maleic acid resin and the like; an alkali metal salt of a formalin condensate of β-naphthalene sulfonic acid; a polymer compound having, at a side chain, a salt of a cationic functional group such as a quaternary ammonium group, an amino group, and the like.

Among those, a polymer compound containing a carboxyl group, including (meth)acryl-based resins such as a styrene-(meth)acryl resin, and the like, a styrene maleic acid resin, a vinylnaphthalene acryl-based resin, a vinylnaphthalene-maleic acid resin, and the like, and a polymer compound containing a sulfonyl group, including a polyvinylbenzenesulfonate resin, a polystyrene-vinyl benzenesulfonate resin, and a styrene-vinylsulfonate resin, are preferable from the viewpoint of dispersion stability of the coloring material.

The weight average molecular weight of the polymer dispersant is preferably 3,000 to 200,000, more preferably 5,000 to 100,000, even more preferably 5,000 to 80,000, and particularly preferably 10,000 to 60,000.

The mixing ratio by mass of the coloring material to the dispersant (coloring material:dispersant) is preferably in a range from 1:0.06 to 1:3, more preferably in a range from 1:0.125 to 1:2, and even more preferably in a range from 1:0.125 to 1:1.5.

Among the polymer dispersants, the water-insoluble dispersant is preferably a vinyl polymer containing a carboxyl group, and more preferably a vinyl polymer which has at least a structural unit derived from an aromatic group-containing monomer as a hydrophobic structural unit, and has a structural unit containing a carboxyl group as a hydrophilic structural unit, from the viewpoint of dispersion stability of the coloring material.

The weight average molecule of the water-insoluble dispersant is preferably from 3,000 to 200,000, more preferably from 5,000 to 100,000, even more preferably from 5,000 to 80,000, and particularly preferably from 10,000 to 60,000, from the viewpoint of dispersion stability of the coloring material.

[Solvent]

The ink composition in the invention is an aqueous ink, and contains water (preferably ion-exchanged water), but may contain other organic solvents, if necessary, for the purpose of facilitating anti-drying, penetration acceleration, viscosity adjustment, or the like.

By using an organic solvent as an anti-drying agent, the clogging of a nozzle, which can occur due to drying of the ink composition at an ink ejecting opening when the ink composition is ejected by an ink jet method to form an image, can be effectively prevented.

For anti-drying, a hydrophilic organic solvent having a vapor pressure lower than that of water is preferred. Specific examples of the hydrophilic organic solvent suitable for anti-drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane, and the like, heterocycles such as 2-pyrrolidone, N-methyl-2-pyrrolidone, 1,3-dimethyl-2-imidazolidinone, N-ethylmorpholine, and the like, sulfur-containing compounds such as sulfolane, dimethylsulfoxide, 3-sulforene, and the like, polyfunctional compounds such as diacetone alcohol, diethanolamine, and the like, urea derivatives, and the like. Among these, polyhydric alcohols such as glycerin, diethylene glycol, and the like are preferred.

Furthermore, by using an organic solvent as a penetration accelerator, the ink composition can be penetrated well into a printing medium. Specific examples of the penetration accelerator include alcohols such as ethanol, isopropanol, butanol, 1,2-hexanediol, and the like, sodium lauryl sulfate, sodium oleate, nonionic surfactants, and the like.

Further, specific examples of the organic solvent used for adjusting the viscosity include alcohols (for example, methanol, ethanol, propanol, and the like), amines (for example, ethanolamine, diethanolamine, triethanolamine, ethylenediamine, diethylenetriamine, and the like), and other polar solvents (for example, formamide, N,N-dimethylformamide, N,N-dimethylacetamide, dimethylsulfoxide, sulfolane, 2-pyrrolidone, acetonitrile, acetone, and the like).

The content of the organic solvent in the ink composition is preferably 0 to 80% by mass, more preferably 0 to 60% by mass, and even more preferably 0 to 50% by mass.

[Water]

The ink composition in the invention contains water, but the amount of water is not particularly limited. The content of water in the ink composition is preferably 10 to 99% by mass, more preferably 30 to 80% by mass, and even more preferably 50 to 70% by mass.

[Other Additives]

The ink composition may contain additives other than the components as described above. Examples of such other additives include known additives such as an anti-fading agent, an emulsion stabilizer, a permeation accelerator, an ultraviolet absorber, a preservative, an anti-mold agent, a pH adjustor, a surface tension adjustor, an anti-foam agent, a viscosity adjustor, a dispersant, a dispersion stabilizer, an anti-rust agent, a chelating agent, and the like. These various additives may be added directly after preparation of the ink composition or may be added during the preparation of the ink composition.

(Ultraviolet Absorber)

An ultraviolet absorber improves the weather resistance of an image. As the ultraviolet absorber, benzotriazole-based compounds described in JP1983-185677A (JP-S58-185677A), JP1986-190537A (JP-S61-190537A), JP1990-000782 (JP-H2-000782A), JP1993-197075A (JP-H5-197075A), JP1997-034057A (JP-H9-034057A), and the like; benzophenone-based compounds described in JP1971-002784A (JP-S46-002784A) and JP1993-194483A (JP-H5-194483A), U.S. Pat. No. 3,214,463, and the like; cinnamic acid-based compounds described in JP1973-030492B (JP-S48-30492B) and JP1981-021141B (JP-S56-21141B), JP1998-088106A (JP-H10-88106A), and the like; triazine-based compounds described in JP1992-298503A (JP-H4-298503A), JP1996-053427A (JP-H8-53427A), JP1996-239368A (JP-H8-239368A), and JP1998-192621A (JP-H10-182621A), JP1996-501291A (JP-H8-501291A), and the like; compounds described in Research Disclosure No. 24239; and compounds typically exemplified by stilbene-based compounds and benzoxazole-based compounds, which absorb ultraviolet rays to emit fluorescence, a so-called fluorescent brightening agent, can be used.

(Anti-Fading Agent)

The anti-fading agent improves a storage property. As the organic anti-fading agent, various organic and metal complex-based anti-fading agents can be used. Examples of the organic anti-fading agents include hydroquinones, alkoxyphenols, dialkoxyphenols, phenols, anilines, amines, indanes, chromans, alkoxyanilines, heterocycles, and the like. Examples of the metal complex-based anti-fading agents include nickel complexes, zinc complexes, and the like. More specifically, compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and the compounds contained in the general formulae and the compound examples of the typical compounds described in JP1987-215272A (JP-S62-215272A), pages 127 to 137 can be used.

(Anti-Mold Agent)

Examples of the anti-mold agent include sodium dehydroacetate, sodium benzoate, sodium pyridinethiol-1-oxide, ethyl p-hydroxybenzoate, 1,2-benzisothiazolin-3-one, salts thereof, and the like. These are preferably used at an amount of 0.02 to 1.00% by mass in the ink composition.

(pH Adjustor)

As the pH adjustor, a neutralizing agent (an organic base or an inorganic alkali) can be used. The pH adjustor is preferably added at an amount such that the ink composition is adjusted to pH 6 to 10, and preferably pH 7 to 10, from the viewpoint of improving the storage stability of the ink composition.

(Surface Tension Adjustor)

Examples of the surface tension regulator include a nonionic surfactant, a cationic surfactant, an anionic surfactant, a betaine-based surfactant, and the like.

Furthermore, the surface tension regulator is added at an amount such that the surface tension of the ink composition is adjusted to preferably 20 to 60 mN/m, more preferably 20 to 45 mN/m, and even more preferably 25 to 40 mN/m, in order to eject the ink composition well by an ink jet method. On the other hand, in the case where the ink composition is applied by a method other than the ink jet method, the surface tension of the ink composition is preferably in the range from 20 to 60 mN/m, and more preferably in the range from 30 to 50 mN/m.

The surface tension of the ink composition is measured under the condition of 25° C. by a plate method, using an Automatic Surface Tensiometer CBVP-Z (available from Kyowa Interface Science Co., Ltd.).

Specific examples of the surfactant include hydrocarbon-based surfactants. Among these are anionic surfactants such as a fatty acid salt, an alkyl sulfate ester salt, an alkyl benzene sulfonate, an alkyl naphthalene sulfonate, a dialkyl sulfosuccinate, an alkyl phosphate ester salt, a naphthalenesulfonic acid-formalin condensate, a polyoxyethylene alkyl sulfate ester salt, and the like; and nonionic surfactants such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylene alkyl amine, a glycerin fatty acid ester, an oxyethylene oxypropylene block copolymer, and the like. Further, SURFYNOLS (available from Air Products & Chemicals Inc.) and OLFINE available from Nissin Chemical Industry Co., Ltd.), which are acetylene-based polyoxyethylene oxide surfactants, are preferably used. In addition, amine oxide-based amphoteric surfactants such as N,N-dimethyl-N-alkylamine oxide, etc. are also preferred.

Additionally, materials described on pages (37) to (38) of JP1984-157636A (JP-S59-157636A) and Research Disclosure No. 308119 (1989) as surfactants can be used.

Further, when fluorine-based (alkyl fluoride-based) surfactants, silicone-based surfactants, etc., such as those described in JP2003-322926A, JP2004-325707A, and JP2004-309806A, are used, the abrasion resistance can be improved.

In addition, the surface tension regulator can also be used as a defoaming agent, and examples thereof include a fluorine-based compound, a silicone-based compound, a chelating agent typically exemplified by EDTA, and the like.

To the ink compositions in the invention may be further added a thickening agent, a conductivity improving agent, an anti-cogation agent, a desiccant, a water-resistant hardening agent, a light stabilizer, a buffering agent, an anti-curling agent, or the like. Examples of the buffering agent include sodium borate, sodium hydrogen phosphate, sodium dihydrogen phosphate, mixtures thereof, and the like, but are not limited thereto.

Further, the total amount of the respective components constituting the ink composition of the invention is evidently no more than 100% by mass.

Next, the ink jet recording method of the invention will be explained.

[Ink Jet Recording Method]

The ink jet recording system is a system in which ink liquid droplets are ejected from a plurality of nozzles or orifices equipped by the recording head of the ink jet printer to allow the ink liquid droplets to be landed onto a printing medium, thereby forming an image. There are a method in which dynamic energy is applied to the ink composition so as to eject the liquid droplets and a method in which thermal energy is applied to the ink composition to blow the ink composition and thus eject the liquid droplets, either of which may be used in the method of the invention. A piezo type recording head is preferably used. If a thermal head is used, heat generated during the ejecting of the ink composition causes the ink composition to be thickened, and thus, the ejecting direction or ejecting amount of the ink composition becomes unstable, or in some cases, the ink composition cannot be ejected. On the other hand, in the case that a piezo type head is used, the ink composition can be ejected well.

The printing speed is not particularly limited, but by the invention method, good image quality can be obtained even with high-speed printing. The printing speed is preferably 50 m/min to 200 m/min. The amount of the liquid per liquid droplet is not particularly limited, but is preferably 2 to 15 pl.

In the ink jet recording method of the invention, while ejecting the ink liquid droplets from the recording head using the ink composition of the invention, the printing medium is heated to no lower than the gelation temperature of the ink composition before or while the ink composition is landed on the printing medium. Specifically, the printing medium is heated to 70° C. or higher, preferably 70 to 100° C., more preferably 70 to 90° C., and even more preferably 70 to 80° C. This temperature is a value obtained by measuring the recording side of the printing medium (the side on which the ink liquid droplets are landed) using a non-contact type thermometer such as an infrared radiation thermometer (for example, trade name: IR-66B available from MK Scientific Inc., etc.), and the like. The position for measurement is between the head section of the ink jet recording apparatus and the printing medium. In the case where the heating temperature is lower than 70° C., the ink composition may not be sufficiently thickened in some cases. Further, in the case that the heating temperature is higher than 100° C., excessive heat source is required, and thus, a load is applied to the system. The heating may be carried out before and during the ink landing. In the invention method, by heating the printing medium, thickening of the ink composition on the printing medium is promoted, and thus, for example, blurring can be suppressed.

The printing medium is not particularly limited, but cellulose-based general printing paper such as high-quality paper, coat paper, art paper, and the like is used. When image recording is carried out on the cellulose-based general printing paper by a general ink jet method using an aqueous ink, absorption and drying of the ink is relatively slow, migration of the coloring material easily occurs after droplet ejection, and image quality is easily lowered. In contrast, according to the method of the invention, recording of an excellent image having a sufficient color density and little strike through can be achieved while suppressing migration of the coloring material.

As the printing medium, a commercially available product can be used, and examples thereof include high-quality paper (A) such as "OK PRINCE WOOD FREE" available from Oji Paper Co., Ltd., "SHIRAOI" available from Nippon Paper Industries Co., Ltd., "New NPI jo-shitsu (high-quality paper)" available from Nippon Paper Industries Co., Ltd., and the like; very light-weight coated paper such as "OK EVER LIGHT COATED" available from Oji Paper Co., Ltd., "AURORA S" available from Nippon Paper Industries Co., Ltd., and the like; lightweight coat paper (A3) such as "OK COAT L" available from Oji Paper Co., Ltd., "AURORA L" available from Nippon Paper Industries Co., Ltd., and the like; coat paper (A2, B2) such as "OK TOPCOAT +" available from Oji Paper Co., Ltd., "AURORA COAT" available from Nippon Paper Industries Co., Ltd., and the like; and art paper (A1) such as "OK GOLDEN CASK GLOSS +" available from Oji Paper Co., Ltd., "TOKUBISHI ART" available from Mitsubishi Paper Mills Ltd., and the like.

[Ink Jet Recording Apparatus]

Examples of an apparatus for carrying out the ink jet recording method of the invention include an ink jet recording apparatus equipped with a recording unit having an ink storage section that stores an ink composition and a head section for ejecting the ink composition in the form of liquid droplets. This apparatus preferably has a unit that heats the printing medium to 50° C. to 120° C., preferably 70 to 100° C., and more preferably 70 to 90° C., and maintains this state (hereinafter, also referred to as a heating unit) before or while the ink droplet is landing on the printing medium. By this device, the ink jet recording method of the invention can be suitably carried out.

The heat source of the heating unit is not limited as long as the printing medium is heated to a required temperature and the ink composition is sufficiently gelled. Specific examples thereof include a hot plate, a heating drum, light irradiation, a hot air source, an electric heater, an infrared lamp, and an infrared laser, and these units can be used in combination with one another. Further, the heating unit may be arranged over or below the printing medium. In addition, the position of the heating unit relative to the head section may be any one that allows the printing medium to be heated to a required temperature before or while the ink composition is landed on the printing medium.

The recording unit is not particularly limited as long as it is used for a general ink jet printer. Examples thereof include ones having the configurations described in Paragraph Nos. 0061 to 0062 of JP1996-333536A (JP-H8-333536A).

Furthermore, in the ink jet recording apparatus of the invention, preferred is a structure in which the head section and the heating unit are arranged close to each other for the liquid droplets of the ink composition to be landed on the printing medium until the heated printing medium is cooled. However, when the head section and the heating unit are too close to each other, there may be some cases where heat from the heating unit is transferred to the head, and thus, the ink composition in the head is gelled, leading to deterioration in ejecting. For this reason, it is preferable to block the heat from the heating unit by taking, for example, a structure in a distance is secured for the ejecting property of the ink composition in the head not to be lost or a structure in which the head is protected with an insulating material.

[Printed Material]

The printed material of the invention can be prepared by printing letters or images on the printing medium, using the ink jet recording method of the invention.

EXAMPLES

Hereinafter, the invention will be described in detail with reference to Examples, but the invention is not limited to the Examples. Further, unless specifically otherwise mentioned, "part(s)" and "%" are based on mass.

Furthermore, the weight average molecular weight was measured with a gel permeation chromatography (GPC). For GPC, HLC-8220 GPC (available from Tosoh Corporation) was used; as the columns, TSKgel Super HZM-H, TSKgel Super HZ4000, and TSKgel Super HZ2000 (all available from Tosoh Corporation) were used by connecting these three columns together in series; and as an eluent, THF (tetrahydrofuran) was used. Regarding the conditions, the sample concentration was 0.45%, the flow rate was 0.35 ml/min, the sample injection amount was 10 µl, the measurement temperature was 40° C., and detection was performed by using an IR detector. Further, the calibration curve was prepared from the following eight samples: "Standard Sample TSK STANDARD POLYSTYRENE": "F-40", "F-20", "F-4", "F-1", "A-5000", "A-2500", "A-1000", and "n-propyl benzene", all available from Tosoh Corporation.

Preparation Example 1

Synthesis of Water-Insoluble Polymer Dispersant P-1

To a 1000-ml three-necked flask equipped with a stirrer and a condenser pipe, 88 g of methyl ethyl ketone was added, and then the flask was heated to 72° C. under a nitrogen atmosphere. Into the flask, a solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was added dropwise over 3 hours. After the completion of dropwise addition, the contents in the flask were further allowed to react for one hour. Thereafter, a solution in which 0.42 g of dimethyl-2,2'-azobisisobutyrate was dissolved in 2 g of methyl ethyl ketone was added thereto, and the resultant mixture was raised to 78° C. and heated at this temperature for 4 hours while heating. The obtained reacted solution was re-precipitated twice in a large excess amount of hexane, and the precipitated resin was dried to obtain 96 g of a water-insoluble polymer dispersant P-1.

The composition of the obtained dispersant P-1 was confirmed by $^1$H-NMR. The weight average molecular weight (Mw) of the dispersant P-1 determined by means of GPC was 44,600. Further, the acid value of the dispersant P-1 determined by a method described in JIS standard (JIS K0070: 1992) was 65.2 mgKOH/g.

Preparation Example 2

Preparation of Dispersion K (Pigment Dispersion) of Resin-Coated Carbon Black Particles With the following composition, carbon black and the like were mixed and stirred with a bead mill using 0.1 mm$\phi$ zirconia beads for 3 to 6 hours to obtain a dispersion. Subsequently, methyl ethyl ketone was removed from the dispersion at 55° C. under reduced pressure and a part of water was further removed to prepare a dispersion K of resin-coated carbon black particles with a carbon black concentration of 10.0% by mass.

(Composition of Dispersion K of Resin-Coated Carbon Black Particles)

| | |
|---|---|
| Carbon black (NIPEX 180-IQ, available from Degussa; specific surface area by means of a BET method: 260 m$^2$/g) | 10.0 parts |
| Water-insoluble polymer dispersant P-1 | 4.5 parts |
| Methyl ethyl ketone (organic solvent) | 30.5 parts |
| 1 mol/L aqueous NaOH solution (neutralizing agent) | 6.3 parts |
| Polyoxyethylene lauryl ether (nonionic surfactant, EMULGEN 109P, available from Kao Corporation, HLB: 13.6) | 0.1 parts |
| Ion-exchanged water | 98.6 parts |

(Measurement of Particle Diameter of Resin-Coated Carbon Black Particles)

For a dispersion K (pigment dispersion) of the obtained resin-coated carbon black particles, a volume average particle diameter was measured by a dynamic light scattering method using a NANOTRACK particle size distribution measuring apparatus UPA-EX150 (available from Nikkiso Co., Ltd.). The measurement was conducted whereby 10 ml of ion-exchanged water was added to 30 µl of the dispersion K of the resin-coated carbon black particles to prepare a sample liquid for measurement, subsequently the sample liquid was adjusted to a temperature of 25° C. The particle diameter of the resin-coated carbon black particle was 98 nm.

Synthesis Example 1

Preparation of Self-Dispersing Polymer Latex L1

In a 2-L three-necked flask equipped with a stirrer, a thermometer, a reflux condenser, and a nitrogen gas introducing pipe, 360.0 g of methyl ethyl ketone was charged, and the temperature was increased to 75° C. A mixed solution containing 180 g of methyl methacrylate, 32.4 g of methoxyethyl acrylate, 126.0 g of benzyl methacrylate, 21.6 g of methacrylic acid, 72 g of methyl ethyl ketone, and 1.44 g of dimethyl-2,2-azobis(2-methylpropionate) (V-601, available from Wako Pure Chemical Industries, Ltd.) was added dropwise to the reactor at a constant speed for completing the dropwise addition in 2 hours. After the completion of the dropwise addition, a solution containing 0.72 g of "V-601" and 36.0 g of methyl ethyl ketone was added, and the resulting mixture was stirred at 75° C. for 2 hours. Thereafter, a solution containing 0.72 g of "V-601" and 36.0 g of methyl ethyl ketone was further added, and the resulting mixture was stirred at 75° C. for 2 hours. Thereafter, the temperature was increased to 85° C., and the mixture was continuously stirred for an additional 2 hours to obtain a resin solution of a methyl methacrylate/methoxyethyl acrylate/benzyl methacrylate/methacrylic acid (=50/9/35/6 [mass ratio]) copolymer.

The weight average molecular weight (Mw) of the obtained copolymer was 66,000 (as calculated in terms of polystyrene by means of gel permeation chromatography (GPC)).

Next, 668.3 g of the resin solution was weighed, 388.3 g of isopropanol and 145.7 ml of a 1 mol/L aqueous NaOH solution were added thereto, and the temperature in the reactor was increased to 80° C. Next, 720.1 g of distilled water was added dropwise at a rate of 20 ml/min for water dispersing. Thereafter, the content in the reactor was held under atmospheric pressure while maintaining the temperature in the reactor at 80° C. for 2 hours, at 85° C. for 2 hours, and then at 90° C. for 2 hours. Subsequently, by reducing the pressure in the reactor, isopropanol, methyl ethyl ketone and distilled water were evaporated in a total amount of 913.7 g to obtain a self-dispersing polymer latex L1 having a solid content concentration of 28.0% by mass.

The MFT of the obtained latex L1 was measured by the following method. MFT (MFT of the latex) was measured using an MFT measuring apparatus available from YOSHIMITU SEIKI K. K. Specifically, the solid content concentration of the obtained latex L1 was adjusted to 25%, coated on a PET film (64 cm×18 cm) with a blade with a length of 50 cm×a width of 3 cm to give a coating film having a thickness of 300 µm, then heated with applying a temperature gradient from 12° C. to 65° C. from the back surface of the PET film under the environment of 20° C. and 22% RH, and dried for 4 hours. At this time, a boundary temperature [° C.] between the temperature at which a white powdery precipitate is formed and the temperature at which a transparent film is formed was measured, and taken as a minimum film-forming temperature (MFT). The measured values are shown in Table 1 below.

Synthesis Example 2

Preparation of Self-Dispersing Polymer Latex L2

In the same manner as in Synthesis Example 1 except that the ratios of methyl methacrylate, methoxyethyl acrylate, benzyl methacrylate, and methacrylic acid were changed in the synthesis of the self-dispersing polymer latex L1, a resin solution of a methyl methacrylate/methoxyethyl acrylate/benzyl methacrylate/methacrylic acid (=55/4/35/6 [mass ratio]) copolymer and a self-dispersing polymer latex L2 having a solid content concentration of 28.0% were obtained.

The weight average molecular weight (Mw) of the obtained copolymer was 77,000 (as calculated in terms of polystyrene by means of gel permeation chromatography (GPC)). Further, the MFT of the obtained latex L2 was measured by the same method as above. The measured values are shown in Table 1 below.

Synthesis Example 3

Preparation of Self-Dispersing Polymer Latex L3

In the same manner as in Synthesis Example 1 except that the ratios of methyl methacrylate, methoxyethyl acrylate, benzyl methacrylate, and methacrylic acid were changed in the synthesis of the self-dispersing polymer latex L1, a resin solution of a methyl methacrylate/methoxyethyl acrylate/benzyl methacrylate/methacrylic acid (=39/20/35/6 [mass ratio]) copolymer and a self-dispersing polymer latex L3 having a solid content concentration of 28.0% were obtained.

The weight average molecular weight (Mw) of the obtained copolymer was 70,000 (as calculated in terms of polystyrene by means of gel permeation chromatography (GPC)). Further, the MFT of the obtained latex L3 was measured by the same method as above. The measured values are shown in Table 1 below.

Synthesis Example 4

Preparation of Self-Dispersing Polymer Latex L4

In the same manner as in Synthesis Example 1 except that the ratios of methyl methacrylate, methoxyethyl acrylate, benzyl methacrylate, and methacrylic acid were changed in the synthesis of the self-dispersing polymer latex L1, a resin solution of a methyl methacrylate/methoxyethyl acrylate/benzyl methacrylate/methacrylic acid (=44/15/35/6 [mass ratio]) copolymer and a self-dispersing polymer latex L4 having a solid content concentration of 28.0% were obtained.

The weight average molecular weight (Mw) of the obtained copolymer was 77,000 (as calculated in terms of polystyrene by means of gel permeation chromatography (GPC)). Further, the MFT of the obtained latex L4 was measured by the same method as above. The measured values are shown in Table 1 below.

Synthesis Example 5

Preparation of Polymer Latex L5

First, 320 g of deionized water was charged into a 1-L one-neck round bottom flask equipped with a mechanical stirrer. The flask was first flushed with nitrogen for 30 minutes, and then soaked in a warm bath at a constant temperature of 40° C. Thereafter, to the flask were added 0.5 g of potassium persulfate, 0.7 g of sodium metabisulfite, 4.0 g of Triton 770 (30% activity), 8.0 g of ethyl acrylate, and 72.0 g of vinylidene chloride, followed by continuously carrying out a polymerization reaction for 16 hours. The solution after the polymerization reaction was cooled and then filtered to obtain a polymer latex L5 having a solid content concentration of 13.9%, including latex particles having an average particle size of 0.061 microns. The MFT of the obtained latex L5 was measured by the same method as above. The measured values are shown in Table 1 below.

Synthesis Example 6

Preparation of Polymer Latex L6

First, 320 g of deionized water was charged into a 1-L one-neck round bottom flask equipped with a mechanical stirrer. The flask was first flushed with nitrogen for 30 minutes, and then soaked in a warm bath at a constant temperature of 40° C. Thereafter, to the flask were added 0.5 g of potassium persulfate, 0.7 g of sodium metabisulfite, 4.0 g of Triton 770 (30% activity), 4.0 g of ethyl acrylate, 36.0 g of vinylidene chloride, 38.4 g of methyl methacrylate, and 3.2 g of sodium 2-sulfo-1,1-dimethylethyl acrylamide (50%), followed by continuously carrying out a polymerization reaction for 16 hours. The solution after the polymerization reaction was cooled and then filtered to obtain a polymer latex L6 having a solid content concentration of 16.1%, including latex particles having an average particle size of 0.065 microns. The MFT of the obtained latex L6 was measured by the same method as above. The measured values are shown in Table 1 below.

Synthesis Example 7

Preparation of Polymer Latex L7

About 1160 mL of water was heated at 90° C. in a reactor. Further, a solution containing 160 mL of water and 1.39 g of potassium persulfate initiator (initiator solution) was prepared. First, a portion of 32 mL of the initiator solution was added to a reactor bath, followed by stirring. Apart from this, a monomer emulsion containing 80 g of styrene, 292 g of hexyl methacrylate, 4 g of ethylene glycol dimethacrylate, 24 g of methacrylic acid, 1.6 g of an isooctyl thioglycolate chain transfer agent, and 9.98 g of 30% Rhodafac RS 710 in 159.4 mL of water was prepared. This monomer emulsion was added dropwise to the reactor over 30 minutes, followed by stirring. Simultaneously, 129.4 g of the initiator solution was added dropwise to the reactor bath over the same period of time. Thereafter, the reaction liquid was stirred at 90° C. for 3 hours, and then cooled to 50° C. to obtain a latex solution. Potassium hydroxide (50% in water) was added thereto to adjust the pH of the latex solution to 8.5. The contents were cooled to an ambient temperature, and then the latex solution was filtered using a 200-mesh filter to obtain a polymer latex L7 having a solid content concentration of 21.8%, including latex particles having an average particle size of about 190 nm (as measured by a light scattering method). The MFT of the obtained latex L7 was measured by the same method as above. The measured values are shown in Table 1 below.

Example 1

Preparation of Aqueous Ink Composition for Ink Jet Recording

Black Ink K1

With the following composition using the dispersion K of the resin-coated carbon black particles, an aqueous ink was prepared. The aqueous ink was charged into a disposable plastic syringe and filtered through a PVDF 5-μm filter (Millex (registered trademark)-SV, diameter 25 mm, available from Millipore Corporation) to prepare a black ink (ink composition for ink jet recording) K1 that is gelled at a high temperature (70° C.). The pH of K1 as measured at 25° C. was 8.6.

(Composition of Black Ink K1)

| | |
|---|---|
| Dispersion K of Resin-Coated Carbon Black Particles | 40.0 parts |
| NEWPOL PE-78 (PEO-PPO-PEO triblock polymer, available from Sanyo Chemical industures, Ltd., Mn: 8700, PEO mass ratio relative to the total amount of the polymer: 80%, gelation temperature: 110° C.) | 5.0 parts |
| Polymer Latex L1 (solid content 28.0%) | 14.3 parts |
| Glycerin (available from Wako Pure Chemical Industries, Ltd.) | 12.0 parts |
| Urea (available from Wako Pure Chemical Industries, Ltd.) | 3.0 parts |
| OLFINE E1010 (surfactant, available from Nissin Chemical Industry Co., Ltd.) | 1.0 part |
| Ion-exchanged water | 10.2 parts |

Image Recording (Black)

A black ink K1 was charged into the piezoelectric heads (384 nozzles), and the recording voltages were adjusted for the ink droplet sizes to fall between 7 to 8 pl. Plain paper NPi-55 (available from Nippon Paper Industries, Co., Ltd., basis weight 55 g/m$^2$) was set on the heating heater, and heated to a paper surface temperature of 70° C. Then, while adjusting the amount of the inks from the two heads, five-stage images with dot percentages of 100%, 80%, 60%, 40%, and 20% at 1 cm×1 cm were printed in a single-pass mode. The paper surface temperature was measured using a radiation thermometer (available from MK Scientific Inc., trade name: IR-66B). Further, the print conditions were as follows.
<Print Conditions>
Recording Speed: 100 m/min
Resolution: 600 dpi
The printed material was evaluated as follows.
(Evaluation of Print Density)

The image density with a printed dot percentage of 100% was measured using a reflection densitometer (X-Rite 528LP) available from X-Rite Inc. The measurement was carried out as described in Japan Color, laying black paper below a sample. The print density was evaluated based on the magnitude of the obtained visual density (A larger value is preferable).

(Evaluation of Strike Through of Image)

The image portion with a printed dot percentage of 100% was measured from the back surface using the reflection densitometer (X-Rite 528LP), and the strike through was evaluated based on the magnitude of the measured values (a smaller value is preferable).

(Evaluation of Initial Ejecting Property)

The solid painted portion with a printed dot percentage of 100% among the print samples was evaluated in accordance with the following criteria.

A: Ink was ejected in all the nozzles from the start portion of the print, and the image was clearly printed.

B: Non-ejected portions were observed in 1 to 3 nozzles in the start portion of the print, but ejecting recovered immediately.

C: Non-ejected portions were observed in 4 or more nozzles in the start portion of the print, but ejecting recovered immediately.

D: Non-ejected portions were observed in most of the nozzles in the start portion of the print, and ejecting did not recover immediately and the image in the solid painted portion was faded.

Furthermore, as the evaluation of the storage stability of the ink, the pH change before and after the high-temperature acceleration test was evaluated.

(Change in pH of Ink)

First, 20 ml of an ink K1 was put into a glass sample bottle and capped with a lid, and a accelerated storage test was carried out in an environment of 60° C. The bottle was taken out after storage for 1 week, and the pH of the ink K1 was measured. In comparison with the pH of the ink K1 before storage under a high temperature condition, evaluation was conducted in accordance with the following criteria.

A: The change in pH before and after the test is less than 0.3.

B: The change in pH before and after the test is 0.3 or more and less than 0.5.

C: The change in pH before and after the test is 0.5 or more and less than 1.0.

D: The change in pH before and after the test is 1.0 or more.

Examples 2 to 7

Preparation of Aqueous Ink Composition for Ink Jet Recording

Black Inks K2 to K7

In the same manner as in the black ink K1, with the type and the amount of the polymer latex being changed to those in Table 1 and the addition amount of ion-exchanged water being adjusted for the total amount of ink to be the same as that of the black ink K1 in the preparation of the black ink K1, black inks K2 to K7 were prepared. The gelation temperatures of the black inks K2 to K7 were each 70° C.

TABLE 1

| | Polymer latex | | | Addition |
|---|---|---|---|---|
| Ink No. | Type | Solid content | MFT | amount |
| K1 | Polymer latex L1 | 28.0% by mass | 75° C. | 14.3 parts |
| K2 | Polymer latex L2 | 28.0% by mass | 85° C. | 14.3 parts |
| K3 | Polymer latex L3 | 28.0% by mass | 55° C. | 14.3 parts |
| K4 | Polymer latex L4 | 28.0% by mass | 65° C. | 14.3 parts |
| K5 | Polymer latex L5 | 13.9% by mass | 65° C. | 28.7 parts |
| K6 | Polymer latex L6 | 16.1% by mass | 75° C. | 24.8 parts |
| K7 | Polymer latex L7 | 21.8% by mass | 80° C. | 18.3 parts |

Example 8

Preparation of Aqueous Ink Composition for Ink Jet Recording Black Ink K8

In the same manner as in the black ink K2, with the type and the amount of the heat-sensitive material (block polymer) being changed to those in Table 2 and the addition amount of ion-exchanged water being adjusted for the total amount of ink to be the same as that of the black ink K2 in the preparation of the black ink K2, a black ink K8 was prepared. The gelation temperature of the black ink K8 was 70° C. and the gelation temperature of the NEWPOL PE-108 was 105° C.

Comparative Examples 1 to 3

Preparation of Aqueous Ink Composition for Ink Jet Recording

Black Inks K9 to K11

In the same manner as in the black ink K1, with the polymer latex L1 not being added and the addition amount of ion-exchanged water being adjusted for the total amount of ink to be the same as that of the black ink K1 in the preparation of the black ink K1, a black ink K9 was prepared. The gelation temperature of the black ink K9 was 70° C.

In the same manner as in the black ink K9, with the addition amount of PE-78 of the heat-sensitive material (block polymer) being changed from 5.0 parts to 8.0 parts and the addition amount of ion-exchanged water being adjusted for the total amount of ink to be the same as that of the black ink K9 in the preparation of the black ink K9, a black ink K10 was prepared. The gelation temperature of the black ink K10 was 70° C.

In the same manner as in the black ink K10, with glycerin being changed to urea in the black ink K10 in the preparation of the black ink K10, a black ink K11 was prepared. The gelation temperature of the black ink K11 was 70° C.

(Evaluation of Viscosity)

The ink viscosities of the black inks K1 to K11 at 25° C. and 70° C. were measured. Using a temperature-varying rotational viscometer (Phisica MCR301 (available from Anton Paar GmbH)), an average of the viscosity values measured five times every $100^{th}$ second after reaching the respective temperatures was taken as a measured value. The measurement was carried out at a shear rate of 10 (1/s) and a temperature-raising rate of 5° C./5 seconds. The results are shown in Table 2.

For the black inks K2 to K11, image recording was carried out in the same manner as for the black ink K1, the printed material was evaluated. And the storage stability of an ink at a high-temperature acceleration test were also evaluated. These evaluation results are shown in Table 3.

TABLE 3

| Ink | | Print density | Strike through | Initial ejecting property | Change in pH |
|---|---|---|---|---|---|
| K1 | Example | 0.94 | 0.15 | A | B |
| K2 | Example | 0.95 | 0.15 | A | B |
| K3 | Example | 0.93 | 0.16 | A | B |
| K4 | Example | 0.92 | 0.15 | A | B |
| K5 | Example | 0.90 | 0.17 | A | B |
| K6 | Example | 0.91 | 0.16 | A | B |
| K7 | Example | 0.93 | 0.16 | A | B |
| K8 | Example | 0.95 | 0.15 | A | B |
| K9 | Comparative Example | 0.81 | 0.22 | A | B |
| K10 | Comparative Example | 0.94 | 0.17 | D | B |
| K11 | Comparative Example | 0.94 | 0.16 | A | D |

Preparation Example 3

Preparation of Dispersion C of Resin-Coated Cyan Pigment Particles

First, 10 parts of Pigment Blue 15:3 (Phthalocyanine Blue A220, available from Dainichiseika Color & Chemicals Mfg. Co., Ltd), 5 parts of the polymer dispersant P-1, 42 parts of methyl ethyl ketone, 5.5 parts of a 1 mol/L aqueous NaOH solution, and 87.2 parts of ion-exchanged water were mixed, and stirred with a bead mill using 0.1 nmφ zirconia beads for 2 to 6 hours to obtain a dispersion.

Methyl ethyl ketone was removed from the dispersion at 55° C. under reduced pressure and a part of water was further removed. The resultant was subjected to a centrifugation treatment for 30 min at 8000 rpm using a high-speed centrifuge cooler 7550 (available from Kubota Seisakusho) equipped with a 50-mL centrifuge pipe, and a supernatant was collected separately from the precipitate to obtain a dispersion C of the resin-coated pigment particles (cyan pigment

TABLE 2

| Ink | K1 | K2 | K3 | K4 | K5 | K6 | K7 | K8 | K9 | K10 | K11 |
|---|---|---|---|---|---|---|---|---|---|---|---|
| Carbon black particle dispersion K | 40.0 | 40.0 | 40.0 | 40.0 | 40.0 | 40.0 | 40.0 | 40.0 | 40.0 | 40.0 | 40.0 |
| NEWPOL PE-78 | 5.0 | 5.0 | 5.0 | 5.0 | 5.0 | 5.0 | 5.0 | | 5.0 | 8.0 | 8.0 |
| NEWPOL PE-108 (*) | | | | | | | | 4.0 | | | |
| Glycerin | 12.0 | 12.0 | 12.0 | 12.0 | 12.0 | 12.0 | 12.0 | 12.0 | 12.0 | 12.0 | |
| Urea | 3.0 | 3.0 | 3.0 | 3.0 | 3.0 | 3.0 | 3.0 | 3.0 | 3.0 | 3.0 | 15.0 |
| Polymer latex L1 | 14.3 | | | | | | | | | | |
| Polymer latex L2 | | 14.3 | | | | | | 14.3 | | | |
| Polymer latex L3 | | | 14.3 | | | | | | | | |
| Polymer latex L4 | | | | 14.3 | | | | | | | |
| Polymer latex L5 | | | | | 28.7 | | | | | | |
| Polymer latex L6 | | | | | | 24.8 | | | | | |
| Polymer latex L7 | | | | | | | 18.3 | | | | |
| OLFINE E-1010 | 1.0 | 1.0 | 1.0 | 1.0 | 1.0 | 1.0 | 1.0 | 1.0 | 1.0 | 1.0 | 1.0 |
| Ion-exchanged water | 24.7 | 24.7 | 24.7 | 24.7 | 10.2 | 14.2 | 20.7 | 25.7 | 39.0 | 36.0 | 36.0 |
| Viscosity (25° C.) mPa·s | 5.6 | 5.7 | 5.6 | 5.3 | 5.7 | 5.4 | 5.6 | 5.8 | 5.1 | 5.8 | 5.3 |
| Viscosity (70° C.) mPa·s | 310.8 | 293.6 | 314.5 | 305.3 | 287.4 | 276.3 | 281.6 | 720.3 | 86.3 | 215.2 | 220.3 |
| pH (25° C.) | 8.6 | 8.4 | 8.4 | 8.3 | 8.5 | 8.2 | 8.3 | 8.4 | 8.3 | 8.4 | 8.7 |

(*) NEWPOL PE-108 (PEO-PPO-PEO triblock polymer, available from Sanyo Chemical industures, Ltd., trade name, Mn: 16250, and PEO mass ratio based on the total amount of the polymers: 80%)

coated with a polymer dispersant) having a cyan pigment concentration of 10.2% by mass (as determined from the absorbance spectrum).

Preparation Examples 4 and 5

Preparation of Dispersion Y of Resin-Coated Yellow Pigment Particles and Dispersion M of Resin-Coated Magenta Pigment Particles A dispersion Y of the resin-coated yellow pigment particles and a dispersion M of the resin-coated magenta pigment particles were prepared in the same manner as the preparation of the dispersion C except that Pigment Blue 15:3 was changed to Pigment Yellow 74 (Irgalite Yellow GS, available from Ciba Japan K.K.) and Pigment Red 122 (Cromophtal Jet Magenta, available from Ciba Specialty Chemicals Inc.) in the preparation of the dispersion C. The pigment concentrations of the dispersion Y and the dispersion M thus obtained were 10.3% by mass and, 10.1% by mass, respectively.

(Measurement of Particle Diameter)

The particle diameters of the pigment particles of the dispersions Y, M, and C thus obtained were measured in the same manner as the method for measuring the particle diameter of the resin-coated carbon black particle. The particle diameters were as follows: Y: 115 nm, M: 105 nm, and C: 97 nm.

Examples 9 to 14

Preparation of Ink Jet Recording Ink

Color Inks Y1, M1, C1, Y2, M2, and C2

In the same manner as in Example 2 except that the dispersion K of the resin-coated carbon black particles in the black ink K2 of Example 3 was changed to the dispersion Y of the resin-coated yellow pigment particles, the dispersion M of the resin-coated magenta pigment particles, and the dispersion C of the resin-coated cyan pigment particles, and further, the addition amount of each dispersion was adjusted for the pigment concentration in the ink to be 4.0% by mass, color inks Y1, M1, and C1 that gel at a high temperature were prepared. Similarly, in the same manner as in Example 3 except that the dispersion K of the resin-coated carbon black particles in the black ink K3 of Example 2 was changed to the dispersion Y of the resin-coated yellow pigment particles, the dispersion M of the resin-coated magenta pigment particles, and the dispersion C of the resin-coated cyan pigment particles, and further, the addition amount of each dispersion was adjusted for the pigment concentration in the ink to be 4.0% by mass, color inks Y2, M2, and C2 that gel at a high temperature were prepared. The gelation temperatures of the color inks Y1, M1, C1, Y2, M2, and C2 were each 70° C. The pH and the viscosities of each color ink at 25° C. and 70° C. are shown in Table 4.

TABLE 4

| Ink | Y1 | Y2 | M1 | M2 | C1 | C2 |
|---|---|---|---|---|---|---|
| Viscosity (25° C.) mPa·s | 5.4 | 5.7 | 5.1 | 5.5 | 6.1 | 6.3 |
| Viscosity (70° C.) mPa·s | 350.8 | 280.6 | 390.5 | 302.5 | 294.3 | 282.6 |
| pH (25° C.) | 8.3 | 8.5 | 8.4 | 8.6 | 7.9 | 8.1 |

Image Recording (Full Color)

A recording apparatus, in which four piezoelectric heads 1 to 4 (384 nozzles, respectively) were arranged side by side and a heating hater capable of heating the printing paper was set, was prepared. The recording apparatus was set for carrying out the printing in the order of the heads 1 to 4. According to Table 5, black, cyan, magenta, and yellow inks were each charged into the heads to give ink sets, and the recording voltages were adjusted for the ink droplet sizes to fall between 7 to 8 pl. Plain paper NPi-55 (available from Nippon Paper Industries, Co., Ltd., basis weight 55 g/m²) was set on the heating heater, and heated to a paper surface temperature of 70° C. Then, the inks with desired colors were ejected from the piezoelectric heads 1 to 4, and five-stage images with dot percentages of 100%, 80%, 60%, 40%, and 20% at 1 cm×1 cm, including primary colors (yellow, magenta, and cyan), secondary colors (red, green, and blue), and tertiary colors (3C), were printed in a single-pass mode. The paper surface temperature was measured using a radiation thermometer (available from MK Scientific Inc., trade name: IR-66B). The combination of the ink sets A and B and the recording conditions were as follows.

<Recording Condition>
Recording Speed: 100 m/min
Resolution: 600 dpi
Distance between head and paper: 0.5 mm

TABLE 5

| Ink jet | Piezoelectric head 1 | Piezoelectric head 2 | Piezoelectric head 3 | Piezoelectric head 4 |
|---|---|---|---|---|
| Ink jet A | K2 | C1 | M1 | Y1 |
| Ink jet B | K3 | C2 | M2 | Y2 |

For each printed color image, evaluation was made as to whether good recording had been carried out in accordance with the following criteria. The results are shown in Table 6.

A: The strike through is good, and there is clean recording without unevenness of the image.
B: The strike through is good, but unevenness of the image is observed.
C: The unevenness of the image is significant and defects such as beading and the like are seen.

TABLE 6

| Ink jet | MFT of polymer latex | Y | M | C | R | G | B | 3C |
|---|---|---|---|---|---|---|---|---|
| Ink jet A | 85° C. (>gelation temperature of ink) | A | A | A | A | A | A | A |
| Ink jet B | 55° C. (<gelation temperature of ink) | A | A | A | B | B | B | C |

In the case where the ink composition did not contain the polymer latex, there occurred problems in the print density and the strike through (K9). When the amount of the heat-sensitive material (block polymer) was increased to promote the gelling of the ink, the print density and the strike through were improved, but the initial ejecting property was deteriorated (K10). At this time, for example, by the addition of an urea derivative, the initial ejecting property was improved, but the stability of the ink was deteriorated (K11). Further, in the case of printing in full color, the unevenness of the image was large and the defects of beading were seen when the MFT of the polymer latex was lower than the gelation temperature of the ink.

In this regard, the ink containing a suitable amount of the polymer latex may have good print performance, initial ejecting property, and storage stability of the ink. In addition, by setting the MFT of the polymer latex no lower than the gelation temperature of the ink, good results were obtained in full color.

What is claimed is:

1. An ink composition for ink jet recording, comprising:
at least water, a coloring material, a block polymer that has an ethylene oxide moiety and a propylene oxide moiety, and is gelled at 50° C. or higher and 150° C. or lower, and a polymer latex,
wherein the polymer latex contains a structural unit derived from an aromatic group-containing (meth)acrylate monomer.

2. The ink composition for ink jet recording according to claim 1, wherein the gelation temperature is 50° C. or higher and 120° C. or lower.

3. The ink composition for ink jet recording according to claim 1, wherein the gelation temperature is 70° C. or higher and 100° C. or lower.

4. The ink composition for ink jet recording according to claim 1, wherein the block polymer is contained in the amount of 3% by mass or more.

5. The ink composition for ink jet recording according to claim 1, wherein the coloring material is a coloring pigment.

6. The ink composition for ink jet recording according to claim 1, wherein the MFT (minimum film-forming temperature) of the polymer latex is no lower than the gelation temperature of the ink composition for ink jet recording.

7. An ink jet recording method, comprising ejecting an ink composition for ink jet recording, containing at least water, a coloring material, a block polymer that has an ethylene oxide moiety and a propylene oxide moiety, and is gelled at 50° C. or higher and 150° C. or lower, and a polymer latex, onto a printing medium that has been heated to no lower than the gelation temperature of the ink composition for ink jet recording to carry out recording,
wherein the polymer latex contains a structural unit derived from an aromatic group-containing (meth)acrylate monomer.

* * * * *